(12) United States Patent
Dimitroff

(10) Patent No.: US 12,201,953 B1
(45) Date of Patent: Jan. 21, 2025

(54) ROTATING VACUUM TANK AND METHOD

(71) Applicant: Ted R. Dimitroff, Columbia, MO (US)

(72) Inventor: Ted R. Dimitroff, Columbia, MO (US)

( * ) Notice: Subject to any disclaimer, the term of this patent is extended or adjusted under 35 U.S.C. 154(b) by 0 days.

(21) Appl. No.: 18/581,854

(22) Filed: Feb. 20, 2024

(51) Int. Cl.
| | |
|---|---|
| *B01F 29/00* | (2022.01) |
| *A47L 7/00* | (2006.01) |
| *A47L 9/24* | (2006.01) |
| *B01F 23/53* | (2022.01) |
| *B01F 29/60* | (2022.01) |
| *B01F 35/71* | (2022.01) |
| *B01F 35/75* | (2022.01) |
| *B08B 5/04* | (2006.01) |
| *B09B 3/38* | (2022.01) |
| *B01F 33/502* | (2022.01) |

(52) U.S. Cl.
CPC ............ *B01F 29/60* (2022.01); *A47L 7/0038* (2013.01); *A47L 9/242* (2013.01); *B01F 23/53* (2022.01); *B01F 35/718* (2022.01); *B01F 35/7543* (2022.01); *B08B 5/04* (2013.01); *B09B 3/38* (2022.01); *B01F 33/5021* (2022.01)

(58) Field of Classification Search
CPC .. B01F 29/60; B01F 35/7543; B01F 33/5021; B01F 35/718; B01F 23/53; A47L 7/0038; A47L 9/242
See application file for complete search history.

(56) References Cited

U.S. PATENT DOCUMENTS

| | | | | |
|---|---|---|---|---|
| 5,918,975 | A | * 7/1999 | Hotchkiss | ............... B28C 5/141 |
| | | | | 366/47 |
| 2006/0250889 | A1* | 11/2006 | Wakefield | ............. B01F 35/451 |
| | | | | 366/142 |
| 2020/0078986 | A1* | 3/2020 | Clifton | ................ B01F 35/3204 |

* cited by examiner

*Primary Examiner* — Anshu Bhatia
(74) *Attorney, Agent, or Firm* — McKee, Voorhees & Sease, PLC

(57) ABSTRACT

A vacuum tank with a rear door, and air and material hoses connectable to the tank door. The tank is rotatable, while the door remains stationary. Liquid, particulate, or slurry material can be vacuumed into the rotating tank, without twisting the hoses. Additional water and/or drying agent can be added to the tank to create a slurry mixture, which can then be discharged from the tank at a convenient dump site. The tank may be mounted on a truck or trailer for transport to a job site and a dump site.

19 Claims, 4 Drawing Sheets

ROTATING VACUUM TANK AND METHOD

TECHNICAL FIELD

The invention relates to a rotatable vacuum tank into which liquid or particulate material is vacuumed and mixed with additional particulate or liquid material, respectively, to create a slurry mixture which can be disposed in an environmentally safe manner.

BACKGROUND

Vacuum equipment is used for hydro-excavation, hazardous waste cleanup, and the like. In the industry of underground pipe repair and replacement, contractors often utilize portable vacuum machines to locate existing utilities and prevent damage thereto. Vacuums are also used to remove slurry material in underground horizontal directional drilling projects.

A vacuum hose suctions liquid or particular material into a stationary tank. The material in the tank may be combined with additional solid or liquid materials to create a slurry, and so as to minimize environmental risks upon disposal of the slurry mixture. The tank may be mounted on a truck or trailer for portability. Mixing paddles or augurs may be provided inside the tank to stir and mix the vacuumed materials with the added materials. The truck or trailer with the tank of slurry mixture is then hauled to a dumpsite for discharge. Depending on the location of the project and they type of material being removed, dump sites may be located long distances from the job site and can have expensive dumping fees, both of which add to the cost of the project. Asbestos-containing matter, such as old underground pipe, also must be handled according to governmental regulations to reduce risk to the operators and to the environment.

Therefore, the primary objective of the present invention is the provision of a rotating vacuum tank into which vacuumed liquids and solids are mixed with additional solids or liquids, respectively, to create a neutralized slurry mixture which can then be safely discharged in a convenient location without environmental risks.

Another objective of the present invention is the provision of an improved vacuum tank and vacuum process which minimizes costs.

A further object of the present invention is the provision of a rotating vacuum tank and vacuum process which is safe, efficient, and environmentally responsible for removing and disposing of various materials from project jobsites.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

SUMMARY

A rotatable vacuum tank has front and rear ends. A drive assembly is operably connected to the front end of the tank to rotate the tank. The rear end of the tank includes a door with one or more ports to which hoses are connected to vacuum materials into the tank and to discharge materials from the tank. The door is mounted on a bearing sleeve, such that the door is stationary as the tank rotates, to prevent twisting of the hoses. The swivel connection of the door sleeve is hinged to the tank, such that the door can be moved between opened and closed positions. A vacuum source and a pressure source apply vacuum or pressure, respectively, inside the tank. The vacuumed material may be a liquid or particulate. Water or other liquids may be added to the tank to mix with the vacuumed particulate material to form a slurry mixture. Alternatively, a drying agent or other solids may be added to liquid in the tank to form a slurry mixture. The slurry mixture can then be discharged, without the release or risk of airborne particles, and the discharge material is allowed to harden. The dumpsite for the slurry material may be a field, an empty lot, or back filling excavations at a project site. The tank may be mounted on a truck or trailer for portability.

DETAILED DESCRIPTION

Figure 1:
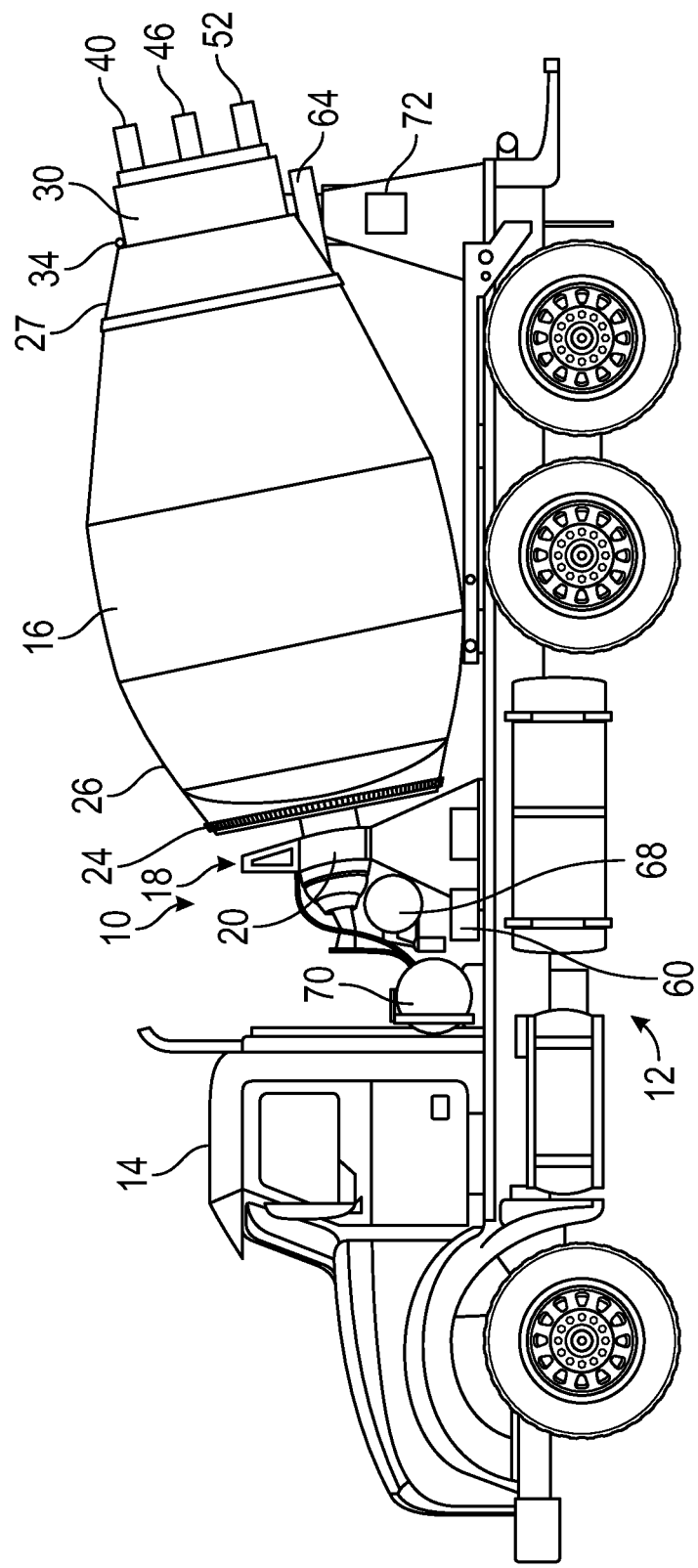
FIG. 1 is a side elevation view of the vacuum tank according to the present invention.
Figure 2:
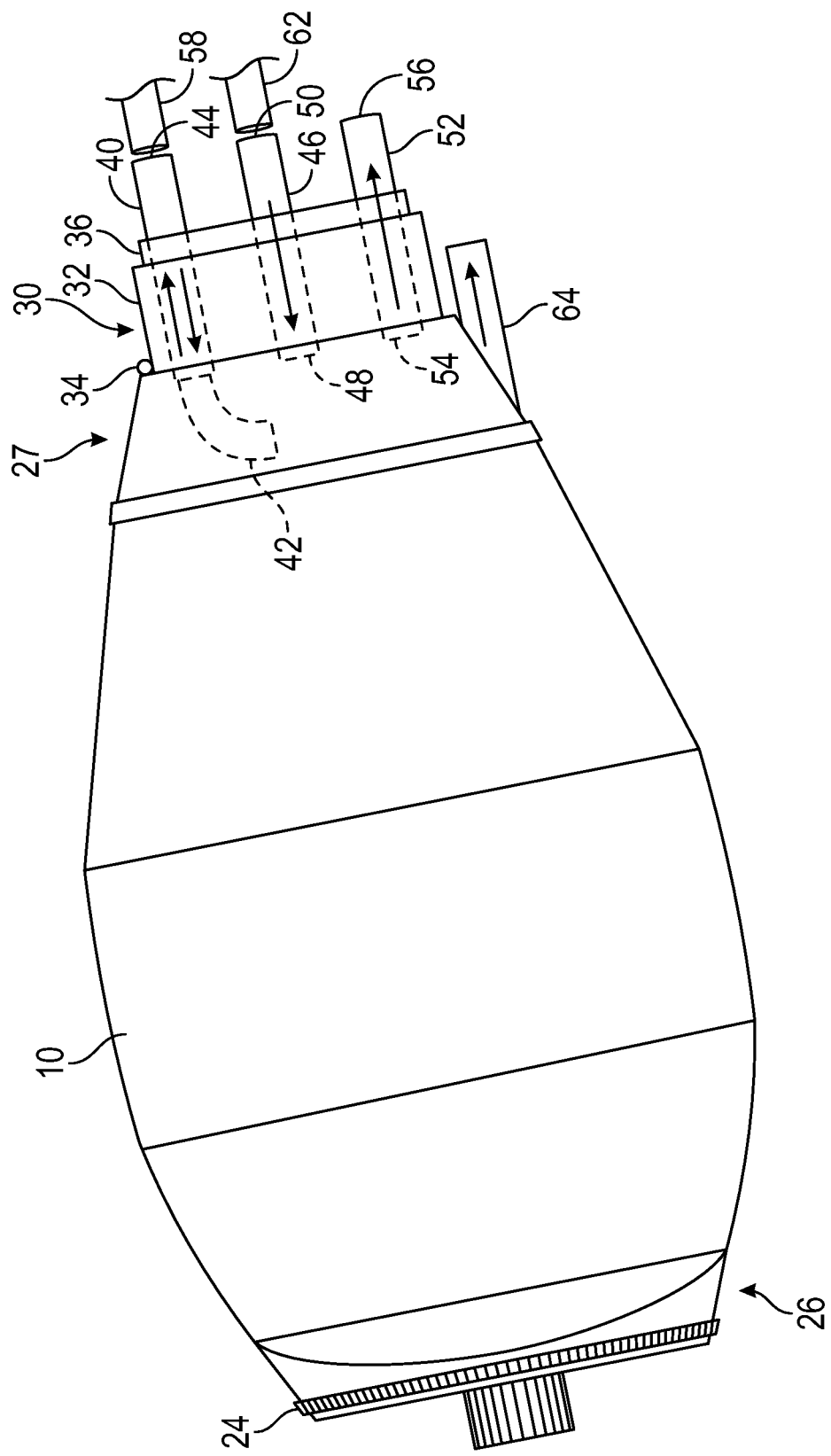
FIG. 2 is a side elevation enlarged view of the rotatable tank shown in FIG. 1.
Figure 3:
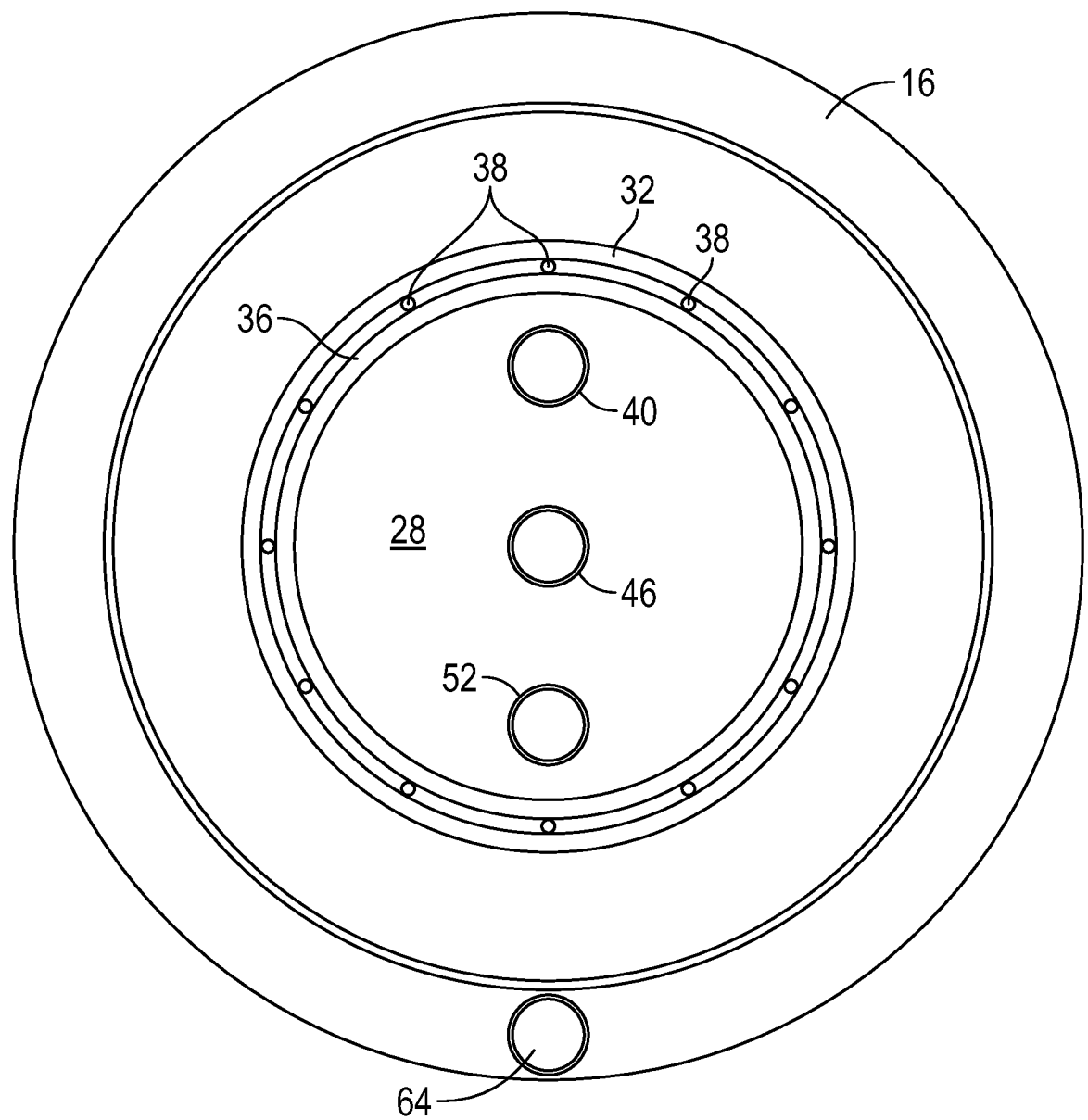
FIG. 3 is a rear end view of the tank door and bearing sleeve.
Figure 4:
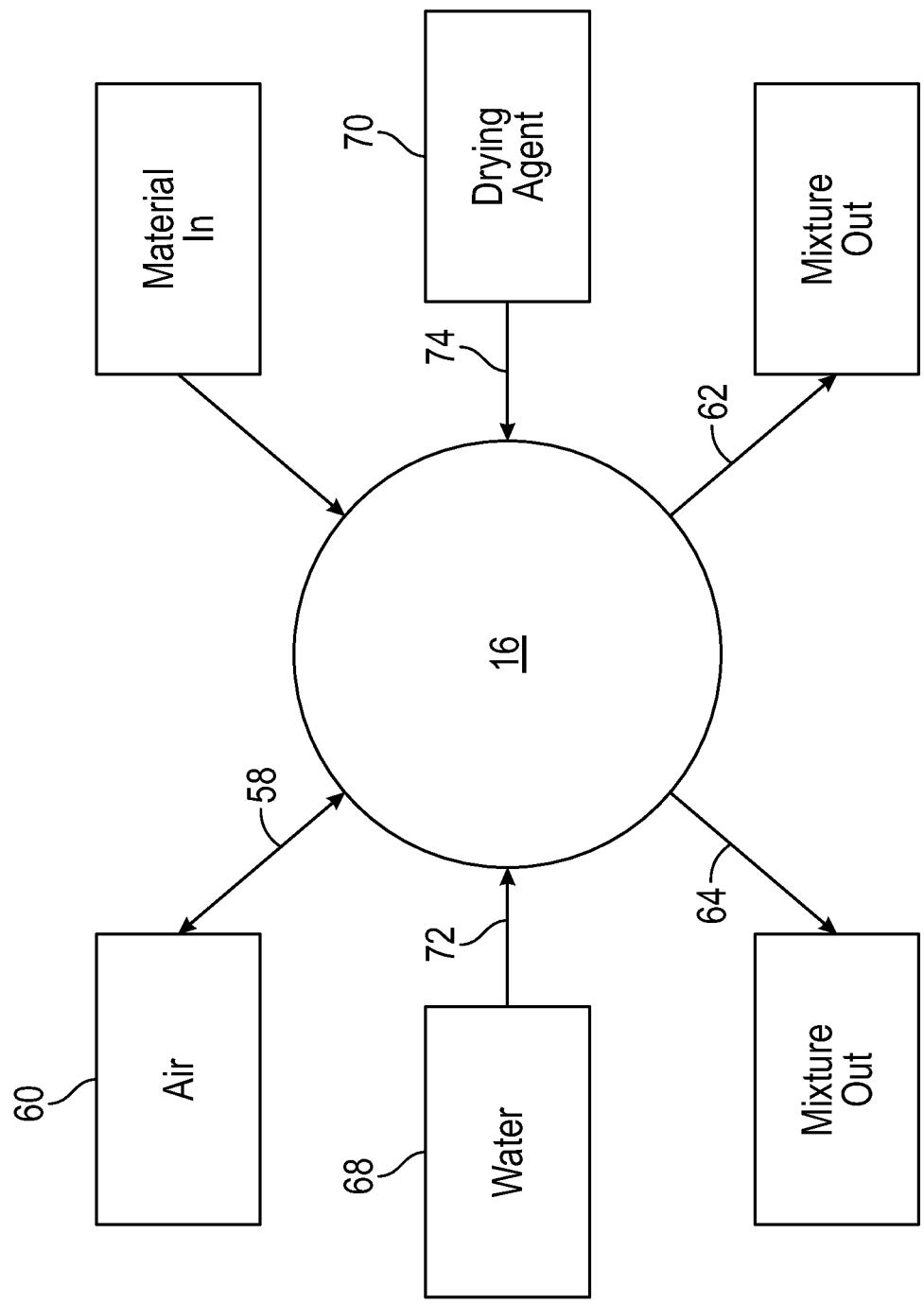
FIG. 4 is a schematic flow chart illustrating the method of the present invention.

A truck for transporting the rotatable vacuum tank of the present invention is generally designated by the reference numeral 10 in the drawings. The truck 10 includes a chassis 12 and a cab 14, which are conventional. A rotatable tank 16 is mounted on the chassis 12. The truck 10 includes a powered drive assembly 18 to rotate the tank 16. One example of the drive assembly 18 is shown in FIG. 1, wherein a motor 20 has an output shaft operably connected to a sprocket and chain 24 on the front end 26 of the tank 16. Alternatively, the drive assembly 18 may be a hydraulic drive system, an electric motor, a gasoline engine, or a manual drive. As an alternative to the truck 10, the tank 16 may be rotatably mounted on a trailer to be pulled by a truck.

The tank 16 is supported on rollers similar to the tank of a ready-mix cement truck. Unlike a ready-mix tank, the tank 16 includes a door 28 mounted in a sleeve assembly 30 on the rear end 27 of the tank. The sleeve assembly 30 includes an outer sleeve 32 attached to the tank 16 by a hinge 34, such that the door 28 is pivotal about the hinge axis so as to be movable between opened and closed positions. The sleeve assembly 30 also includes an inner sleeve 36 fit within the outer sleeve, with bearings 38 between the outer and inner sleeves 32, 36. The door 28 is fixed to the inner sleeve 36. The bearings 38 allow the outer sleeve 32 to rotate with the tank 16, while the inner sleeve 36 and the door 28 remain stationary.

The door 28 includes a first tube 40 extending through the door having an inner end 42 and an outer end 44. The door 28 includes a second tube 46 extending therethrough, with inner and outer ends 48, 50. A third tube 52 extends to the door 28, and has an inner end 54 and an outer end 56. The tubes 40, 46 and 52 define first, second, and third ports in or through the door 28. An air hose 58 has opposite ends removably connected to the outer end 44 of the first tube 40 and an air source 60, such as a reversible pump, so as to provide positive or negative air pressure inside the tank 16. A material vacuum hose 62 is removably connected to the outer end 50 of the second tube, or to the outer end 56 of the third tube 52. The hoses 58, 62 can be secured to the tubes with any conventional coupler. While the drawings show the tubes 40, 46, 52 to have the same diameters, it is understood that their diameters may vary from one another, with the hoses having diameters to fit the respective tubes.

The tank 16 also has a discharge tube 64 adjacent the rear end 27 of the tank, and apart from the door 28.

The truck 10 or trailer (not shown) includes a supply tank 68 for water or other liquid, and a supply tank 70 for particulate material, such as a drying agent. The liquid supply 68 and the particulate supply 70 have appropriate delivery systems or plumbing for connection to the tank 16, with pumps and shut off valves (not shown) such that the water, liquid, drying agent, or other particulate material may be added to the to the rotating tank 16.

In use, the truck 10 or trailer with the tank 16 is driven to a jobsite wherein material needs to be removed. The material may be a liquid, particulate, or slurry. For example, the tank 16 can be used at a hydro-excavation site, an underground pipe repair or replacement site, a horizontal directional drilling site, or a hazardous material spill site. The air hose 58 is connected to the air source 60 and to the first tube 40. The vacuum hose 62 is connected to the second tube 46. The air source 60 is actuated to provide a vacuum through the hoses 58, 62 such that material at the site can be suctioned into the tank 16, as the tank rotates via the drive assembly 18. If the vacuumed material is liquid, a drying agent or other material from the supply 70 may be added to the tank 16 to create a slurry mixture. If the vacuumed site material is a particulate, water, or other liquid from the supply 68 can be added to the tank 16 to create a slurry mixture. If the vacuumed material at the jobsite is a slurry material, additional liquid, or particulates from the supplies 68, 70 may or may not need to be added to the tank 16. Rotation of the tank 16 mixes the contents to form a slurry material, which can then be discharged at any convenient location.

One option for discharge of the slurry mixture is by connecting the second hose 62 to the third tube 52, closing or shutting the tube 46 via a valve, gate, door, or other closure mechanism on the outer end of the respective tube or on the coupler for the tube and hose, and reversing the air source 60 so as to provide a positive pressure inside the tank 16, thereby forcing the slurry material out the hose 62, as the tank 16 rotates. Alternatively, rotation of the tank 16 can be stopped, the tube 46 is shut or closed, and the hose 62 connected to the fixed discharge tube 64 on the tank to discharge slurry material therethrough. Another option is to disconnect or disable the drive assembly 18, and raise the front end 26 of the tank 16 so as to drain slurry material out of the fixed tube 64, with or without the hose 62 connected thereto. As a further option for cleaning out the tank 16, with the tank rotation stopped, the door 28 can be opened via the hinge 34 for removal of material from the tank. A vibrator, shaker or oscillation motor 72 may be provided on the for the tank 16 to facilitate clean out of slurry material from the tank 16.

It is understood that the size or volume of the tank 16 may vary, depending on the jobsite need. A smaller tank may be hand rotated with a crank or handle. A larger tank will be rotated with a powered drive assembly 18. Also, the door 28 may have additional tubes or ports for coupling additional hoses, beyond that shown in the drawings. For example, preferably the water source 68 and the particulate or drying agent source 70 are connected to the tank 16 through the door 28 so that the additives may be delivered, as needed, through the stationary door as the tank 16 rotates.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. A method of removing a first material from a work site, comprising:
   vacuuming the first material into a rotating tank;
   adding a second material to the rotating tank to mix with the first material in the tank to form a mixture;
   discharging the mixture from the tank; and
   the first material being vacuumed into the tank via a first port on a rear door of the tank and the mixture being discharged from the tank via a second port on the rear door.

2. The method of claim 1 wherein the first material is a liquid and the second material is a particulate.

3. The method of claim 2 wherein the second material is a drying agent.

4. The method of claim 1 wherein the first material is a particulate, and the second material is a liquid.

5. The method of claim 1 wherein the mixture is a slurry.

6. The method of claim 1 wherein the rear door is stationary as the tank rotates.

7. The method of claim 1 wherein the rear door which is moveable between opened and closed positions, and the door being closed when the first material is vacuumed into the tank.

8. The method of claim 7 wherein the rear door is in the opened position for cleaning the mixture from the tank.

9. The method of claim 1 wherein the material is vacuumed by negative air pressure in the tank and the mixture is discharged by positive air pressure in the tank.

10. A method of removing a first material from a work site, comprising:
    vacuuming the first material into a rotating tank;
    adding a second material to the rotating tank to mix with the first material I the tank to form a mixture;
    discharging the mixture from the tank; and
    the first material being vacuumed through a first hose connected to a first tube on a rear door of the tank and the mixture being discharged through a second hose connected to a second tube on the rear door of the tank.

11. A method of removing material at a work site, comprising:
    vacuuming the material into a tank;
    supplying an additive to the tank;
    rotating the tank to form a slurry of the material and the additive;
    discharging the slurry from the tank; and
    vibrating the tank during discharge of the slurry.

12. The method of claim 11 wherein the slurry is discharged using a positive air pressure inside the tank.

13. The method of claim 11 wherein the slurry is discharged by gravity from the tank.

14. The method of claim 11 further comprising raising one end of the tank to drain the slurry from an opposite lower end of the tank.

15. The method of claim 11 wherein the material is a particulate and the additive is a liquid.

16. The method of claim 11 wherein the material is a liquid and the additive is a particulate.

17. The method of claim 11 wherein the material is a liquid and the additive is a drying agent.

18. The method of claim 11 wherein the material is a slurry mixture and the additive is selected from a liquid and a particulate.

19. The method of claim 11 wherein the material and the slurry flow through different paths into and out of the tank, respectively.

\* \* \* \* \*